(12) United States Patent
Otterbach

(10) Patent No.: US 8,038,928 B2
(45) Date of Patent: Oct. 18, 2011

(54) METHOD FOR MANUFACTURING A CERAMIC FILTER ELEMENT

(75) Inventor: Sabine Otterbach, Tamm (DE)

(73) Assignee: Mann + Hummel GmbH, Ludwigsburg (DE)

( * ) Notice: Subject to any disclaimer, the term of this patent is extended or adjusted under 35 U.S.C. 154(b) by 308 days.

(21) Appl. No.: 12/337,027

(22) Filed: Dec. 17, 2008

(65) Prior Publication Data

US 2009/0158698 A1      Jun. 25, 2009

(30) Foreign Application Priority Data

Dec. 21, 2007    (DE) .................. 10 2007 062 832

(51) Int. Cl.
B01D 39/14    (2006.01)

(52) U.S. Cl. ....... 264/628; 264/630; 55/523; 55/DIG. 5; 422/177

(58) Field of Classification Search ............ 55/522–524; 422/169–172, 177–182
See application file for complete search history.

(56) References Cited

U.S. PATENT DOCUMENTS

| | | | | |
|---|---|---|---|---|
| 2,884,091 | A | * | 4/1959 | Baldwin .................. 55/500 |
| 4,280,926 | A | * | 7/1981 | Abe et al. ................ 502/159 |
| 7,052,532 | B1 | * | 5/2006 | Liu et al. ................. 96/154 |
| 2003/0138635 | A1 | * | 7/2003 | Haruta et al. ............ 428/413 |
| 2004/0231307 | A1 | | 11/2004 | Wood et al. |
| 2005/0274096 | A1 | | 12/2005 | Yamada et al. |
| 2006/0182669 | A1 | * | 8/2006 | Matumura et al. ....... 422/177 |

FOREIGN PATENT DOCUMENTS

| | | |
|---|---|---|
| DE | 10122939 | 11/2001 |
| DE | 102005028713 A1 | 2/2006 |
| DE | 102004058119 | 6/2006 |
| EP | 0412930 | 2/1991 |
| EP | 1666123 A | 6/2006 |
| JP | 58079515 | 5/1983 |
| JP | 60216819 | 10/1985 |
| JP | 61192319 | 11/1986 |
| JP | 63134020 | 6/1988 |
| JP | 62057624 | 7/1994 |
| WO | WO2006005668 | 1/2006 |

OTHER PUBLICATIONS

EP Search Report of related EP patent application EP08169776.

* cited by examiner

*Primary Examiner* — Duane Smith
*Assistant Examiner* — Amber Orlando
(74) *Attorney, Agent, or Firm* — James Hasselbeck

(57) ABSTRACT

In a method for manufacturing a ceramic filter element for an exhaust gas filter for internal combustion engines, a combustible non-ceramic support web provided with flow channel is impregnated with ceramic slurry. Subsequently, the support web, formed in a desired geometric shape, is fired until the support web is combusted and a rigid filter body is produced. Before impregnating the support web, a combustible sealing bead is applied such onto the support web that the flow channels are closed alternatingly by the sealing bead.

13 Claims, 5 Drawing Sheets

METHOD FOR MANUFACTURING A CERAMIC FILTER ELEMENT

BACKGROUND OF THE INVENTION

The present invention relates to a method for manufacturing a ceramic filter element for an exhaust gas filter of an internal combustion engine.

In Patent Abstracts of Japan JP 63134020 A, a ceramic filter element for an exhaust gas filter of an internal combustion engine is disclosed that is comprised of a corrugated spirally wound filter web. For producing the filter web, heat-resistant inorganic fibers are mixed in an aqueous suspension with ceramic powder and then processed to a web. Several stacked webs are then rolled to the desired shape of the filter body and between neighboring filter webs honeycomb-shaped flow channels are formed. The filter body is subsequently fired at high temperature.

WO 2006/005668 discloses a method for producing a ceramic filter element of an exhaust gas filter for internal combustion engines. In this connection, first a combustible, non-ceramic support web is impregnated with ceramic slurry and is subsequently fired, in the desired geometric shape, to such an extent that the support web is combusted and a rigid filter body is formed.

Disadvantages of these methods are, on the one hand, the relatively high expenditure and, on the other hand, the fact that in the conventional methods folds and wavy sections are produced that can cause cracks in the components.

Further, it is a disadvantage that with the conventional methods no cavities in the components to be produced can be provided in a targeted way.

There is therefore the need to provide ceramic filter elements that avoid the aforementioned disadvantages of the prior art.

SUMMARY OF THE INVENTION

It is therefore an object of the present invention to provide a method for producing a ceramic filter element in an exhaust gas filter of an internal combustion engine that avoids as much as possible crack formation in the filter element.

It is a further object of the present invention to provide a method such that a targeted introduction of cavities into the filter element is enabled.

These and further objects are solved by a method for manufacturing a ceramic filter element where a combustible non-ceramic support web that is provided with flow channels is impregnated with a ceramic slurry and is subsequently fired, in the desired geometric shape, to such an extent that the support web is combusted and a rigid filter body is formed, wherein before impregnation with the ceramic slurry a combustible sealing bead is applied such to the combustible non-ceramic support web that the flow channels are closed off alternatingly by the sealing bead.

BRIEF DESCRIPTION OF THE DRAWING

In the Figures same or functionally identical elements, if not specified otherwise, are referenced by same reference numerals.

DESCRIPTION OF PREFERRED EMBODIMENTS

Honeycomb-shaped ceramic filter elements have an excellent heat resistance and are therefore used as catalyst supports for automobile exhaust gases and as filters for filtering soot out of the exhaust gas of diesel engines.

In order to create a filter body having in cross-section a honeycomb structure in which in the axial direction of the filter body flow channels for the exhaust gas to be filtered are formed, two stacked support web layers are connected or glued to one another wherein at least one of the two support web layers is serrated or corrugated in order to provide the aforementioned flow channels (semi-finished product manufacture). The support web layers are preferably embodied as paper webs and are comprised of cellulose. However, other organic or inorganic substances that are combustible are also suitable. The two stacked support web layers can be wound on a winding machine to an approximately cylindrical filter body of a wound or coiled filter 2 (compare FIG. 1A). Of course, other geometric shapes and configurations are possible also.

In order for the exhaust gas to pass the filter body radially, the flow channels 4 at one end face of the coiled filter 2 are closed off; this is usually done by a ceramic, i.e., non-combustible, adhesive that is applied between the stacked support web layers in the area of one end faces of the flow channels. The ceramic adhesive hardens upon firing and remains as a plug in the end face section of the flow channels. A disadvantage in this connection is that as a result of early application of the ceramic slurry the ceramic plugging compound can dry up and crack. It may then be required to apply the slurry again. Moreover, upon application of the slurry the paper of the support web may swell so that wavy structures result that can also cause cracks.

In order to keep the stacked support web layers during the firing process in proper shape, it can be advantageous to fix them in position by means of an adhesive that upon firing will combust substantially without any residue. For example, as an adhesive a polymer adhesive can be used. Important in this connection is that the materials of sealing bead and ceramic solution will not mutually destroy one another and the firing or sintering will remove only the combustible sealing bead.

Figure 1A:
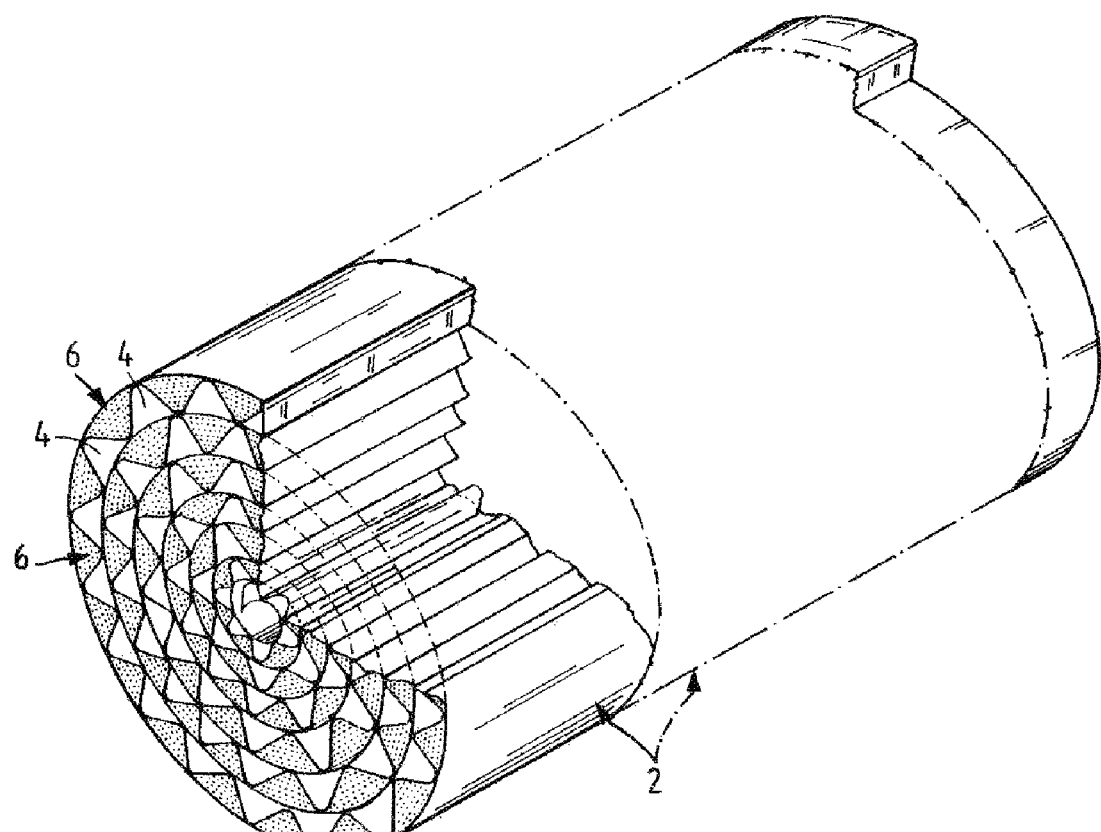
FIGS. 1A (front view) and 1B (rear view) show in partial section a cylindrical filter body according to the invention with alternatingly closed-off flow channels after application of the combustible sealing bead.
Figure 1B:
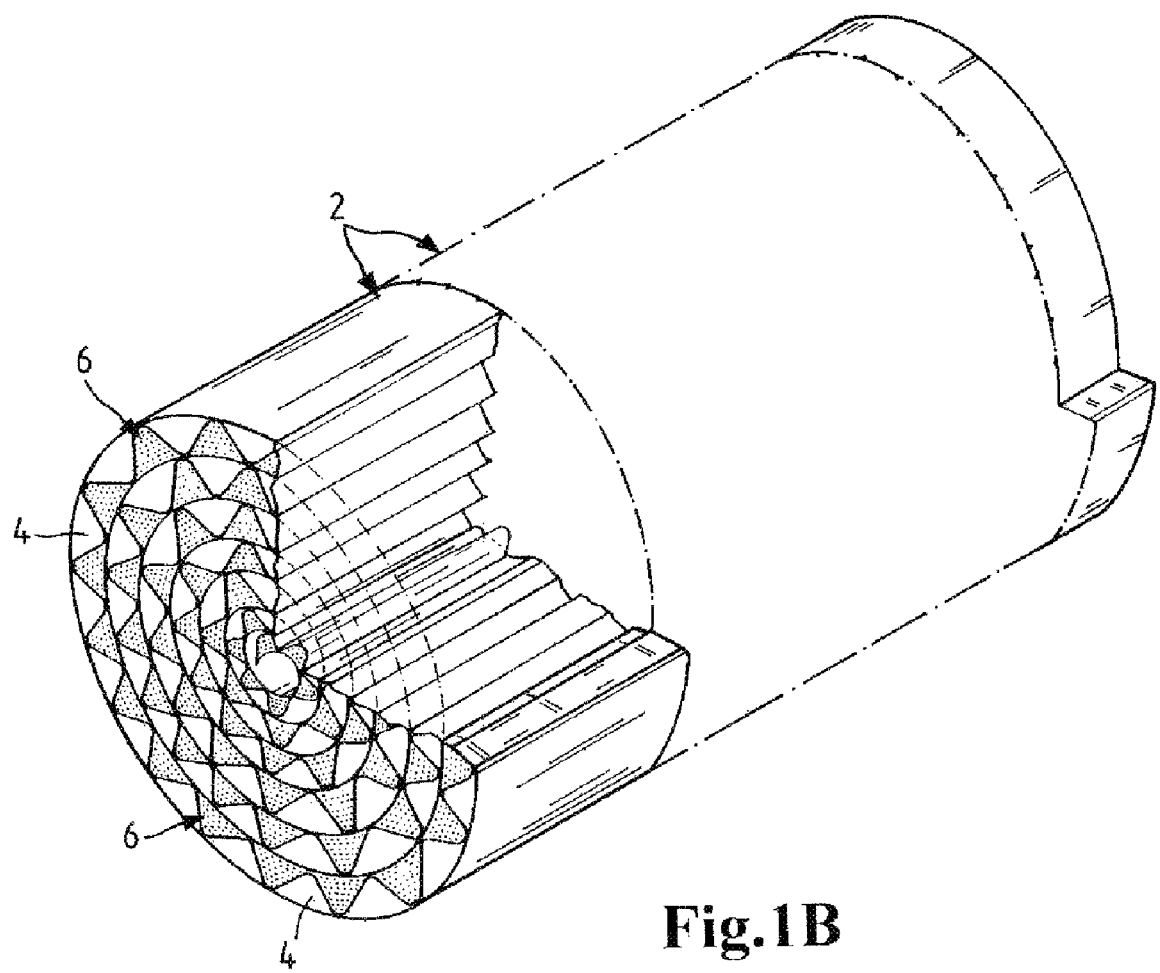

In the manufacture of the wound filter 2 according to the invention, as indicated in FIGS. 1A and 1B, in the semi-finished product manufacture a combustible sealing bead 6 will be applied such onto the combustible non-ceramic support web that the flow channels 4 are alternatingly closed off by the sealing bead 6. The combustible sealing bead 6 is applied alternatingly on both sides of the non-ceramic combustible support web (for closing the channels preferably at their outer edge), i.e., on one side (FIG. 1A) of the support web between the flat and the corrugated or serrated web layers during the semi-finished product manufacture and on the opposite side (FIG. 1B) onto the corrugated or serrated layer during winding, so that after winding the channels 4 are alternatingly closed off as indicated in FIGS. 1A and 1B (front side and rear side).

The combustible sealing bead 6 can be e.g. comprised of polyurethane (PU), silicone, rubber, silicone resins, polyethylene and the like. The width of the combustible sealing bead can be selected as needed and is preferably approximately 3 mm to approximately 10 mm, more preferred 3 mm to approximately 5 mm. The sealing bead 6 begins at the start of the wound material (coil) and ends at the end of the wound material (coil). The channels can be filled as desired with ceramic plugging compound. In other geometric shapes it is of course also possible to apply the sealing bead in a different way. Of course, it is also possible to apply further combustible sealing beads in the interior of the support web in order to make possible the creation of cavities in a targeted fashion in the interior of the filter element. Of course, it is also possible to apply further combustible sealing beads in the interior or also on/in the core of the wound material (coil) in order to make possible the introduction of cavities in a targeted fashion in the interior or the core of the filter element.

In case of a component that requires holes in the interior, it is possible to apply "sealing bead dots" already during the manufacture of the wound material or semi-finished product which dots later on are to generate the holes. These dots are of low viscosity (thin) and penetrate therefore better into the paper or the selected material.

Figure 2:
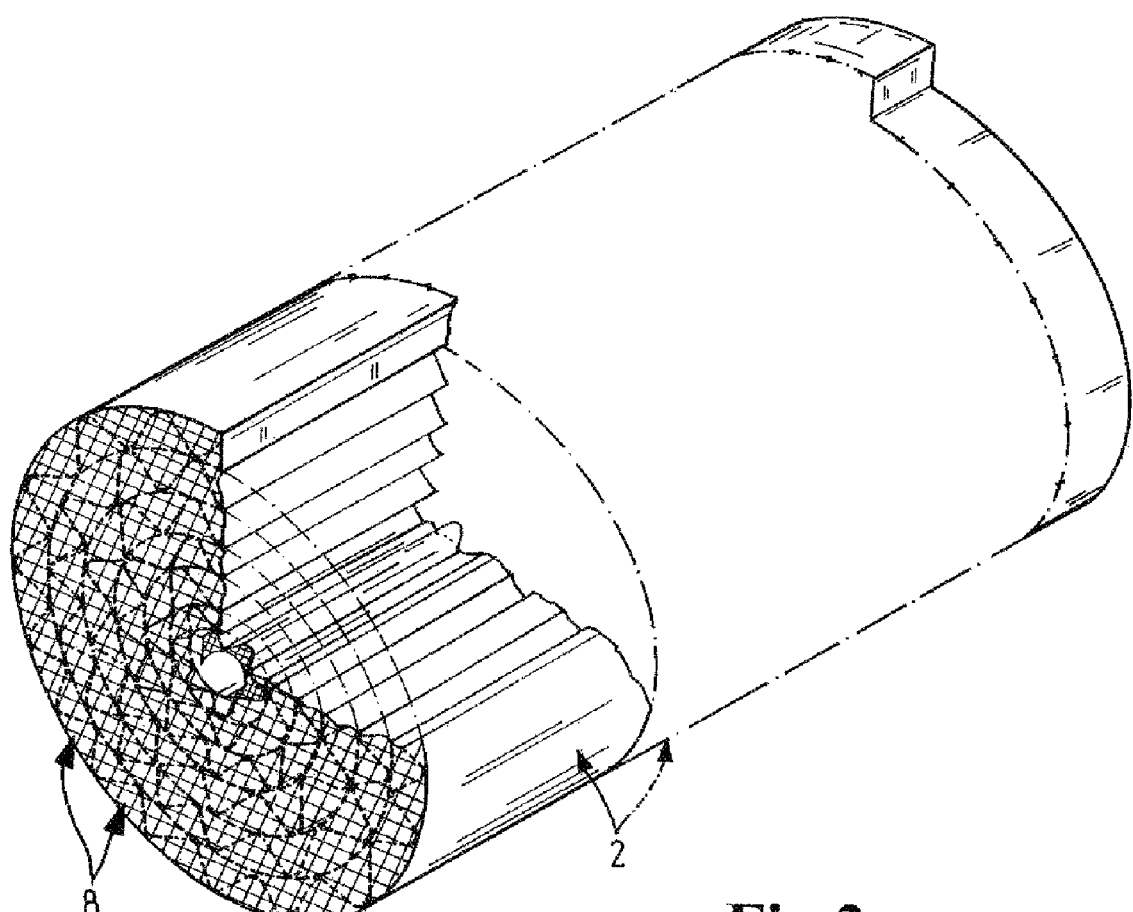
FIG. 2 shows the cylindrical filter body according to the invention after introduction of the ceramic plugging compound.

After application of the sealing bead or beads 6 the wound paper coil is immersed or pushed into a ceramic plugging compound 8, depending on the consistency of the plugging compound. It is also possible to apply the ceramic plugging compound in other ways into the channels, for example, by pressing, immersing, injecting, impregnating, pouring, or the like. Subsequently, the coil is impregnated with ceramic slurry, dried, and sintered. As a ceramic material in the slurry e.g. aluminum oxide, cordierite, mullite, silicon carbide and the like can be used. It is also possible to fill the ceramic plugging compound, after impregnation with the ceramic slurry, into the free channels. The ceramic plugging compound in this case is introduced somewhat below the PU sealing bead because the channels to be closed have very thin walls (approximately 1 mm). For thicker walls, beginning at approximately 1.5 mm (paper thickness), the non-combustible and the combustible sealing beads can be applied directly adjacent to one another. After impregnation with the ceramic slurry all flow channels are closed off, as shown in FIG. 2.

Figure 3A:
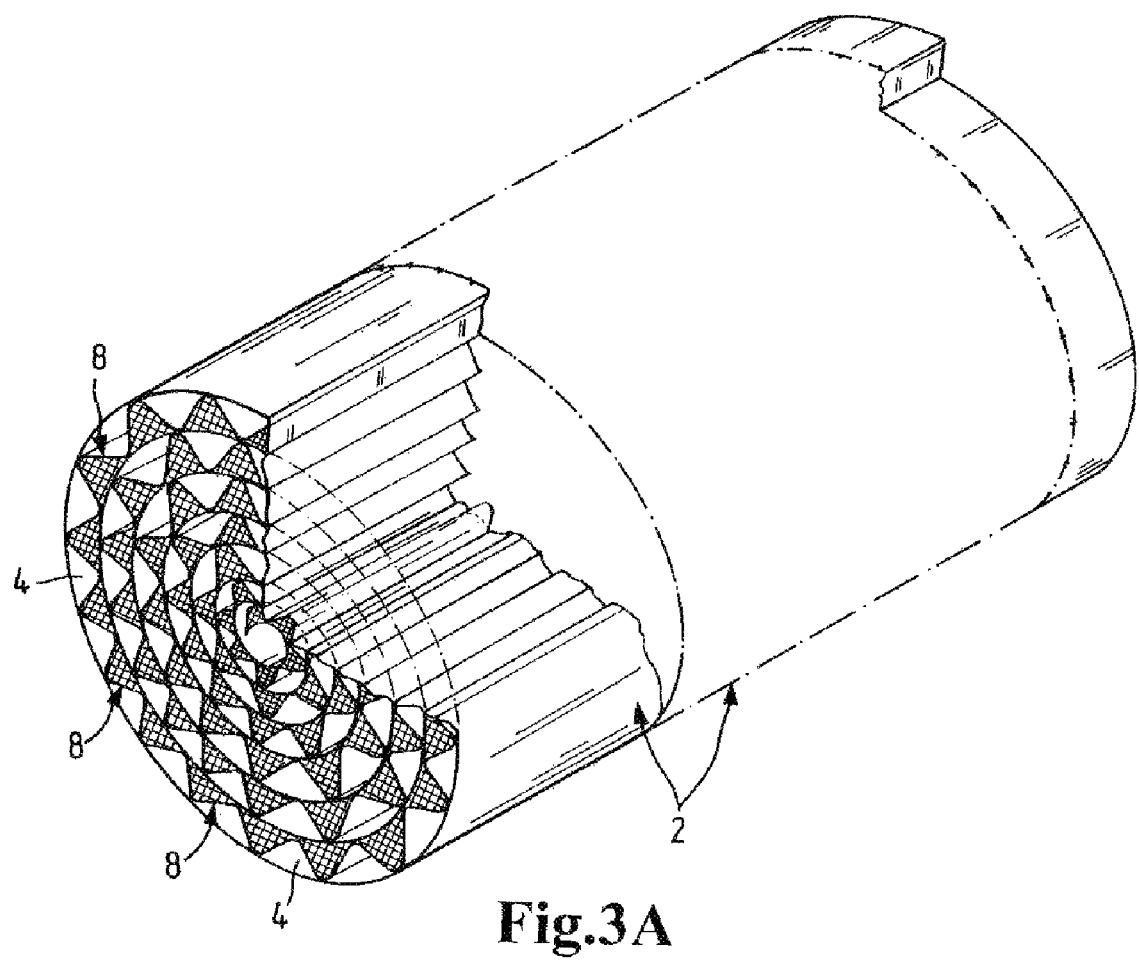
FIGS. 3A (front view) and 3B (rear view) show in partial section a cylindrical filter body according to the invention after combustion of the combustible sealing bead.
Figure 3B:
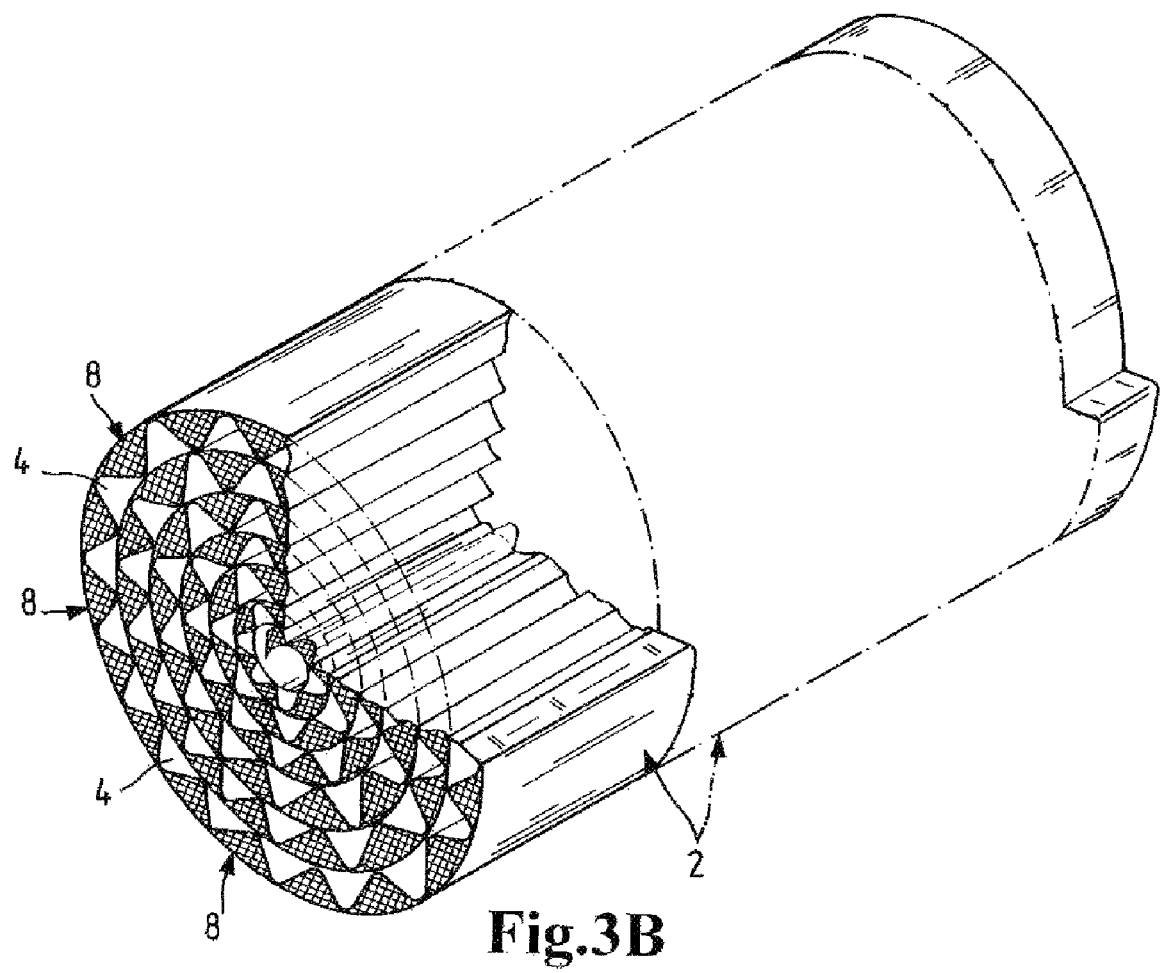

After sintering at approximately 500 degrees Celsius the combustible sealing beads and the non-ceramic combustible support web are burned off. The channels that are filled with ceramic plugging compound remain intact and close alternatingly the flow channels. This structure is shown in FIGS. 3A and 3B (views of the front and rear sides of the coiled filter body 2).

The combustible sealing bead or beads 6 serve as a temporary closure of the flow channels so that it is prevented that upon introduction of the ceramic plugging the "wrong" channels are filled.

This principle can also be applied where cavities, holes or the like are to be produced that, by conventional manufacturing processes, cannot be produced or can be produced only in a complicated way, for example, in ceramic filter elements, diesel particle filters, catalysts and also in ceramic components of the conventional and simple manufacture type.

While specific embodiments of the invention have been shown and described in detail to illustrate the inventive principles, it will be understood that the invention may be embodied otherwise without departing from such principles.

What is claimed is:

1. A method for producing a ceramic filter element of an exhaust gas filter for internal combustion engines, the method comprising:
    providing a combustible non-ceramic support web provided with flow channels;
    applying a combustible sealing bead such onto said combustible support web such that flow channels are closed alternatingly by said sealing bead;
    forming said support web into a desired geometric shape;
    immersing or pushing said shaped support web into a non-combustible ceramic plugging compound wherein at least a portion of said flow channels are closed off by said plugging compound;
    impregnating with a ceramic slurry said shaped combustible non-ceramic support web provided with said flow channels;
    subsequently firing said support web, formed in said desired geometric shape, until said support web is removed by combustion and a rigid ceramic filter body is produced;
    wherein said combustible sealing bead consisting of an adhesive that, in said firing step, combusts substantially without leaving residue in said ceramic filter body after said firing step,
    wherein said ceramic plugging compound remains after said firing, said plugging compound forming ceramic plugs closing said closed off flow channels of said ceramic filter body after said firing step.

2. The method according to claim 1, wherein said sealing bead is selected from the group consisting of polyurethane, silicone, rubber, silicone resins, and polyethylenes.

3. The method according to claim 1, wherein said sealing bead is applied to an outer edge of said support web.

4. The method according to claim 1, further comprising
    applying at least one additional sealing bead in the interior of said support web, said at least one sealing bead creating at least one cavity in a targeted fashion within said support web.

5. The method according to claim 1, wherein
    said support web is comprised of two stacked support web layers,
    wherein at least one of said support web layers is preshaped in such a way that said flow channels are formed and
    wherein said applying a sealing bead step is practiced by
    applying a first combustible sealing bead on a first side of a combustible non-ceramic support web; and
    applying a second combustible sealing bead on an opposing second side of said combustible support web.

6. The method according to claim 1, wherein said sealing bead has a width of 3 mm to 10 mm.

7. The method according to claim 6, wherein said sealing bead has a width of 3 mm to 5 mm.

8. The method according to claim 1, wherein
    said support web is wound to a coil forming a cylindrical filter body and
    wherein said sealing bead extends continuously from a beginning of said coil to an end of said coil.

9. A diesel particle filter comprising a ceramic filter element produced according to claim 1.

10. The method according to claim 1, wherein
    said firing step is practiced at approximately 500 degrees C.

11. The method according to claim 1, wherein
    in said providing step, said support web has walls with a thickness of approximately 1.5 mm or less;

wherein in said immersing or pushing step, said ceramic plugging compound is spaced apart from said sealing bead in said flow channels.

12. The method according to claim 1, wherein before said impregnating step, the method further comprises applying at least one sealing bead dot onto said support web, said sealing bead dot having a viscosity low enough to penetrate said support web, thereby blocking said ceramic slurry impregnation at said sealing bead dot and thereby forming a hole in said ceramic filter body at said sealing bead dot in said firing step.

13. The method according to claim 1, wherein in said immersing or pushing step, all of said flow channels are closed off by said plugging compound.

* * * * *